US012228664B2

(12) United States Patent
Guillot et al.

(10) Patent No.: US 12,228,664 B2
(45) Date of Patent: Feb. 18, 2025

(54) LOCATING A TRANSMITTER BY MEANS OF A PLURALITY OF GEOGRAPHICALLY REMOTE RECEIVING STATIONS USING KNOWN OBJECT PATHS

(71) Applicant: SAFRAN DATA SYSTEMS, Courtaboeuf (FR)

(72) Inventors: Baptiste Guillot, Moissy Cramayel (FR); Yann Picard, Moissy Cramayel (FR)

(73) Assignee: SAFRAN DATA SYSTEMS, Courtaboeuf (FR)

( * ) Notice: Subject to any disclaimer, the term of this patent is extended or adjusted under 35 U.S.C. 154(b) by 344 days.

(21) Appl. No.: 17/788,973

(22) PCT Filed: Dec. 24, 2020

(86) PCT No.: PCT/FR2020/052625
§ 371 (c)(1),
(2) Date: Jun. 24, 2022

(87) PCT Pub. No.: WO2021/130463
PCT Pub. Date: Jul. 1, 2021

(65) Prior Publication Data
US 2023/0037150 A1 Feb. 2, 2023

(30) Foreign Application Priority Data

Dec. 26, 2019 (FR) .................................... 1915619

(51) Int. Cl.
*H04W 24/00* (2009.01)
*G01S 5/02* (2010.01)
*G01S 5/06* (2006.01)

(52) U.S. Cl.
CPC ........ *G01S 5/02216* (2020.05); *G01S 5/0246* (2020.05); *G01S 5/06* (2013.01)

(58) Field of Classification Search
CPC ...... G01S 5/02216; G01S 5/0246; G01S 5/06; G01S 5/02213
See application file for complete search history.

(56) References Cited

U.S. PATENT DOCUMENTS

| 5,361,212 A * | 11/1994 | Class | ................... G01S 5/0009 701/16 |
| 5,594,425 A * | 1/1997 | Ladner | .................. G08G 1/205 340/539.18 |
| 5,600,706 A * | 2/1997 | Dunn | ....................... G01S 5/14 455/566 |

(Continued)

FOREIGN PATENT DOCUMENTS

| EP | 1 701 177 A2 | 9/2006 |
| EP | 1 701 177 A3 | 9/2006 |

OTHER PUBLICATIONS

French Preliminary Search Report issued for the priority application No. FR1915619, completed date Oct. 22, 2020.

(Continued)

*Primary Examiner* — Stephen M D Agosta
(74) *Attorney, Agent, or Firm* — BIRCH, STEWART, KOLASCH & BIRCH, LLP (57) ABSTRACT

The invention relates to a method for locating a transmitter, which is implemented in a processing unit of a processing station of a locating system.

11 Claims, 3 Drawing Sheets

(56) References Cited

U.S. PATENT DOCUMENTS

| | | | | |
|---|---|---|---|---|
| 5,926,133 | A * | 7/1999 | Green, Jr. | H04W 64/00 342/450 |
| 6,236,365 | B1 * | 5/2001 | LeBlanc | G01S 5/0009 342/450 |
| 6,249,252 | B1 * | 6/2001 | Dupray | H04W 4/029 342/357.29 |
| 6,310,576 | B1 * | 10/2001 | Johnson | H04W 64/00 342/465 |
| 8,994,591 | B2 * | 3/2015 | Dupray | H04W 64/00 342/465 |
| 10,218,408 | B1 * | 2/2019 | Shaffer | H04B 1/7075 |
| 2001/0022558 | A1 * | 9/2001 | Karr, Jr. | G01S 5/0278 342/450 |
| 2002/0080070 | A1 * | 6/2002 | Harles | G01S 13/325 342/458 |
| 2002/0147542 | A1 * | 10/2002 | Tomescu | G08G 5/0082 342/36 |
| 2003/0222820 | A1 * | 12/2003 | Karr | G01S 5/0009 342/457 |
| 2004/0056796 | A1 * | 3/2004 | Brenner | G01S 19/071 342/357.29 |
| 2007/0001903 | A1 * | 1/2007 | Smith | G01S 19/072 342/465 |
| 2009/0109090 | A1 * | 4/2009 | Vollath | G01S 19/07 342/357.44 |
| 2009/0231192 | A1 * | 9/2009 | van Diggelen | G01S 19/27 342/357.66 |
| 2009/0289851 | A1 | 11/2009 | Lommen et al. | |
| 2010/0171652 | A1 * | 7/2010 | Gutt | G01S 19/235 342/352 |
| 2011/0234456 | A1 * | 9/2011 | McBurney | G01S 19/27 342/357.42 |
| 2011/0285589 | A1 * | 11/2011 | Bull | G01S 19/48 342/387 |
| 2012/0059578 | A1 * | 3/2012 | Venkatraman | G01S 19/396 701/411 |
| 2014/0015713 | A1 * | 1/2014 | Liu | G01S 19/254 342/357.69 |
| 2015/0161249 | A1 * | 6/2015 | Knox | G06F 16/35 707/737 |
| 2018/0132201 | A1 * | 5/2018 | Guillot | G01S 5/06 |
| 2018/0190125 | A1 * | 7/2018 | Hayee | G08G 1/167 |
| 2019/0149322 | A1 * | 5/2019 | Bar-Nahum | H04W 12/06 380/278 |

OTHER PUBLICATIONS

International Search Report "PCT/ISA/210", issued in PCT/FR2020/052625, dated Apr. 8, 2021.

Written Opinion of the International Searching Authority "PCT/ISA/237", issued in PCT/FR2020/052625, dated Apr. 8, 2021.

\* cited by examiner

FIG. 2

ND OF A PLURALITY OF GEOGRAPHICALLY
REMOTE RECEIVING STATIONS USING
KNOWN OBJECT PATHS

GENERAL TECHNICAL FIELD

The invention relates to the field of the location of an object and more particularly an object transmitting radio frequency waves or a signal.

More generally, the invention relates to systems equipped with a plurality of sensors and dedicated to the reception, analysis and use of signals, using for this purpose the diversity of the properties of one and the same signal as perceived in geographically different places.

The invention more precisely relates to the synchronization of receiving stations geographically remote from a location system of a transmitter.

PRIOR ART

To accurately remotely locate an object transmitting or returning a signal, one of the main methods used requires fine measurement of the separation in receiving dates of one and the same portion of this signal received by several stations located in several geographical places. In particular, the location is carried out by computing a trajectory of the object by jointly or separately making use of TDOA (Time Difference of Arrival) measurements and of FDOA (Frequency Difference of Arrival) measurements.

In order to measure the TDOA and FDOA portions of signals, dated by each station by means of its local time base, are transmitted then compared, for example by time and frequency correlation in a common processing unit in order to extract therefrom time-domain and frequency-domain separations which are the TDOA and FDOA. Another means of measuring the FDOA and TDOA consists for example in comparing the times or frequencies of reception of an identifiable element of the signal and received simultaneously by each station. The documents EP 1 701 177 A2 and US 20091189851 A1 describe such techniques.

To have reliable measurements, it is important that are local time bases of each station be all mutually synchronized.

To do this, each station receives signals from one or more satellite positioning systems known as GNSS (Global Navigation Satellite System) such as for example GPS, GLONASS, Galileo or BeiDu. Specifically, these GNSS systems make it possible to retrieve an absolute universal time as well as an extremely stable frequency reference, to which the local time base is slaved.

One problem is that, sometimes, access to GNSS systems is scrambled, degraded or even unavailable (following a malfunction or a malicious act), which leads to a loss of this universal time. Even if the stations are equipped with very stable local clocks, they will drift from the loss of GNSS, which will more or less quickly result in a sufficient separation to no longer guarantee the required measurement accuracy.

Thus, to ensure continuity in the location, a certain resilience to this loss is necessary since it is necessary to guarantee sufficient operational security of the locating systems, particularly when these are critical applications. A critical application is for example the monitoring of the trajectories of satellite constellations in low orbit, to meet the regulatory requirements applicable to such an operator, particularly relating to the risk of collision between spatial objects (risk of conjunction).

To be resilient, the system of synchronization with a GNSS system can support several constellations (for example, GPS, GLONASS, Galileo, BeiDu, etc.) but the only signals used are concentrated in the same frequency band, inducing a shared vulnerability to interference and scrambling.

To palliate the loss of universal time, provision can be made for distributing to each station a common time base via a cable link, for example optical fiber, over great distances to all the receiving stations. Each local time base would then use this common time base.

However, such a solution based on own means would be too burdensome and the use of public networks in which it is necessary to traverse many layers of varied protocols and hardware does not allow good performance to be obtained, particularly in terms of differential accuracy (significant time jitter at the terminations).

It can also be envisioned to slave the local clocks to a time base radio-broadcast at LF (low frequency), such as DCF77, but the accuracy of these systems is insufficient for the requirement.

Also, it is necessary to have another means for accurately resetting the time bases of the stations with respect to one another and at least to control their differential drift.

OVERVIEW OF THE INVENTION

The invention makes provision for a method making it possible to very accurately estimate the relative drifts of the local clocks of remote stations in such a way as to synchronize them in order to accurately locate a transmitter. As a function of the types of local clocks used, its reliability is very great over ten or so days, or even more, which corresponds to a time period during which one remains capable of correctly using ephemerides of celestial objects in the absence of an absolute clock.

For this purpose, the invention makes provision, according to a first aspect, for a method for locating a transmitter, implemented in a processing unit of a processing station of a locating system comprising the following steps:
  receiving signals acquired by geographically remote receiving stations, said signals being dated by local time bases of each receiving station and corresponding to signals from a transmitter to be located and from at least one known object;
  determining, on the basis of the dated signals, of
    measured TDOAs relating to the transmitter to be located and to the object; and/or
    measured FDOAs relating to the transmitter to be located and to the object;
  determining, on the basis of known ephemerides relating to the object and of geographical positions of the stations;
    theoretical TDOAs relating to the object; and/or
    theoretical FDOAs;
  determining, by taking the difference of the measured and theoretical TDOAs and/or FDOAs relating to the object, a residual error affecting the measured TDOAs and/or FDOAs;
  determining, on the basis of the residuals affecting the measured TDOAs and/or FDOAs, a number of data of correction of the local time bases.

The method according to the first aspect of the invention is able to be completed by the following features, taken alone or in any of their technically possible combinations;

it comprises a step of determining, on the basis of the measured TDOAs and/or FDOAs relating to several objects, an indicator of reliability of said measured time-domain or frequency-domain separations, said reliability indicator making it possible to determine whether or not the ephemerides of the known object can be used for the correction of the local clock and for, in particular, determining whether or not the known object is in the process of maneuvering;

it comprises a step of determining the location of the object or known object(s) on the basis of measurements taken by the stations;

the location is used to determine the reliability indicator, said determining consists, advantageously, in comparing several measured TDOAs and/or FDOAs for several objects which are known but different to check the consistency of the residual errors with one another and determine the set of objects that can be used for the correction of the local clock;

the method comprises a step of determining the location of the transmitter using measured TDOAs and/or FDOAs once the receiving stations have corrected their local time base;

the receiving stations are mutually synchronized by means of a signal coming from a satellite positioning system, preferably intermittently.

According to a second aspect, the invention makes provision for a processing station of a system for locating a transmitter to be located, comprising a processing unit configured to implement a method according to the first aspect of the invention.

According to a third aspect, the invention makes provision for a receiving station of a system for locating a transmitter to be located, said locating system comprising a processing station according to the second aspect of the invention, the receiving station comprising:

a local clock configured to provide a local time base;
a first receiver configured to acquire signals from an object to be located;
said first receiver being further configured to acquire signals from a celestial or artificial object, the behavior of which is predictable or known, said acquired signals being dated by the local time base.

The receiving station advantageously further comprises a second receiver configured to acquire signals from a satellite positioning system, said second receiver being further configured to demodulate the signals acquired by the second receiver to extract therefrom an absolute time base in order to correct the local time base of each receiving station.

The invention makes provision according to a fourth aspect for a locating system comprising at least two receiving stations according to the third aspect and a processing station according to the second aspect of the invention.

Advantageously, the locating system is such that the processing station is constituted by one of the receiving stations.

The invention makes provision according to a fifth aspect for a computer program product comprising code instructions for implementing a method for locating according to the first aspect of the invention, when the latter is executed by a computer.

The principle of the invention therefore consists in resetting the time bases of several receiving stations with respect to one another by receiving via radio frequency means the signal emitted by natural or artificial celestial objects which are in common visibility and the displacement of which is known or predictable independently of the GNSS constellations. In particular, these can be celestial objects, the trajectory of which is estimated by the system itself. Here these objects will be referred to by the expression "known objects".

To do this, remote receiving stations are equipped with a local time base which is provides a date by counting the ticks of a clock signal oscillating at a very stable frequency.

They collect, via their antenna and radio frequency devices, the signal of transmitters to be located, the GNSS signal when it is available, and the signal of other known objects which are in common visibility from at least two receiving stations, preferably three stations for better accuracy. After coherent conversion and synchronous sampling of the signal of the target to be located and of the signal from the time-domain and frequency-domain reference source, digitized signal sample sequences are dated by the local time base.

The receiving stations communicate with a processing unit which can where applicable be co-located with one of the receiving stations. They send it these signal sequences dated for the tracked transmitters (those to be located) as well as the reference objects. If there is enough time-domain and frequency-domain overlap between the sequences, the processing unit can then search for the time and frequency separation providing maximum correlation of the signals from one and the same object or transmitter for each pair of stations. These time and frequency separations (TDOA and FDOA) are therefore computed in the respective local time bases of each of the receiving stations. When the ephemeris, according to celestial mechanics, of a known object is known in an absolute time base (or alternatively that of the processing station) then the processing unit also computes the theoretical TDOA (and where applicable the FDOA) thereof for the same pair of stations.

When the time bases of the pair of stations are perfectly aligned and calibrated, they are slaved to absolute time, then the theoretical and measured TDOA and FDOA must coincide, to the nearest irreducible errors. Among them are the thermal receiver noise and the short-term clock jitter which are statistically zero and only have a short-term effect.

In the mid- or long-term, the TDOA/FDOA residual error, i.e. the separation between the measured and theoretical values, when it is not zero, is formed by the following contributions and offsets:

drift of the local time base;
bias between the timestamp and the local time base;
dispersion of atmospheric and ionospheric propagation.

When it can be considered that these offsets are inherent to each station, independently of the received object, the residual error between measured and theoretical TDOA/FDOA therefore provides an estimation of the difference of these offsets between each pair of stations, and does so whatever the object of reference, the ephemeris of which is known. The processing unit therefore computes these values in the regular calibration phase.

If one has several known objects, the ephemerides of which are known, then the estimation becomes more accurate. However, for an object to be located for which the ephemeris is not known, the correction associated with this estimation of the timestamp separation can then be applied, i.e. one can subtract the residual since it is unique and the corrected TDOA/FDOA measurement then coincides of necessity with the theoretical computation, i.e. the ephemeris that one can then extract.

When the GNSS signal is lost, then the time bases of each receiving station drift slowly with a date separation that remains for several days remains low enough to be able to correctly use ephemerides expressed in an absolute time base. One collects the signal of known objects, i.e. for which the ephemerides are predictable by celestial mechanics such as stars or geostationary satellites which do not undergo any maneuver, and uses them to continue to correct the time-stamping separations between the time bases of the receiving stations.

To guarantee good operational security, the system is programmed to sequentially collect several known objects. One then checks that all the objects provide a consistent set of corrections of date separations. If certain objects provide erroneous corrections, they must then be (temporarily) set aside from the list of references. In the case of a geostationary satellite, this will in particular mean that it has undergone a maneuver in the meantime.

OVERVIEW OF THE FIGURES

Other features, aims and advantages of the invention will become apparent from the following description, which is purely illustrative and non-limiting, and which must be read with reference to the appended drawings wherein.

In all the figures similar elements bear identical reference numbers.

DETAILED DESCRIPTION

Figure 1:
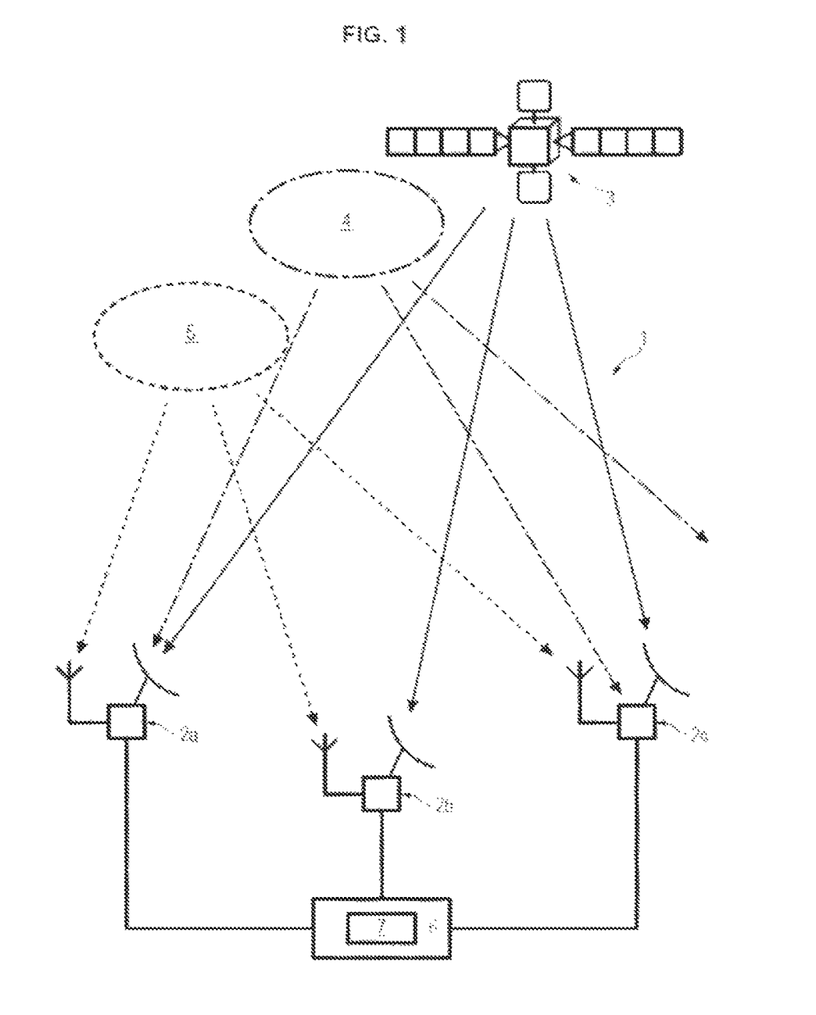
FIG. 1 illustrates a locating system according to the invention

In relation to FIG. 1, a system for locating 1 a transmitter 3 of a radio frequency signal comprises at least two receiving stations 2a, 2b, 2c.

The receiving stations 2a, 2b, 2c are geographically remote, separate and distant and are in a link with a processing station 6 which is used to process the signals from these receiving stations 2a, 2b, 2c to determine time offsets and frequency offsets of one and the same signal received by each of these stations and, on the basis of these offsets, deduce therefrom a trajectory of the transmitter 3 and therefore its location. These time and frequency offsets are the TDOA and FDOA explained in the introduction. The processing station 6 is, in FIG. 1, separate from the receiving stations but in a particular embodiment, one of the receiving stations can also be the processing station.

The transmitter 3 to be located is for example a satellite but it can be any object as long as it transmits a radio frequency signal which can be received by at least two receiving stations.

In FIG. 1, three stations are shown, two stations may be enough but the greater the number of stations the better the accuracy of the computations.

Figure 2:
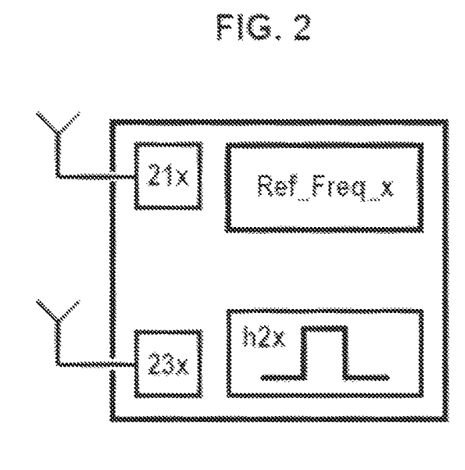
FIG. 2 illustrates a receiving station of a locating system according to the invention.

In relation to FIG. 2, each receiving station 2x (x=a or b or c) comprises a first receiver 21x configured to acquire signals from the transmitter 3 to be located and a second receiver 23x configured to acquire signals from one or more satellites of one or more GNSS constellations 5.

Furthermore, the first receiver 21x is configured to acquire signals from the known object 4. Specifically, since the processing of the known object serves to evaluate the characteristic parameters of the imperfections inherent to the receiving stations and degrading the accuracy of location of the transmitter 3, it is consequently essential that the process of receiving the signals coming from the known object 4 undergoes the same degradations and does not go via a dedicated receiving line.

The signals from natural or artificial celestial objects make it possible to palliate the absence of the GNSS signal as will be seen further on.

These celestial or artificial objects are for example stars or else geostationary satellites. In the following description the expression "known object" will be used to denote these objects. These known objects have the advantage that their ephemerides are well-known and that their trajectory can therefore be computed reliably and the TDOAs and/or FDOAs can be predicted. Specifically, since the TDOA and FDOA are predictable it is possible, by comparing values computed on the basis of the measurements and values resulting from the predictions, to evaluate any errors in the computations of the TDOA and/or FDOA of the transmitter to be located.

Furthermore, a signal emitted by a radiating celestial body is noise related to its equivalent temperature which is therefore detectable if its temperature is relatively high in relation to the cosmic radiation at 3 Kelvins (Sun, moon, quasar, etc.). Since the terrestrial stations are relatively close by comparison with their distance from these celestial bodies, they see this celestial body from a virtually identical angle and therefore receive the same thermal noise, but at times that are slightly shifted due to the difference in mutual separation of the stations.

Hence, the correlation of the two signals will be at a maximum when these two signals have been realigned: the autocorrelation function of wideband white noise is indeed a "Dirac" pulse at time 0. Thus, it will be understood that a noise has correlation properties (the Fourier transform of the autocorrelation function of a noise gives its spectrum by definition).

Returning to FIG. 2, each receiving station 2a, 2b, 2c further comprises a local clock h2x configured to provide a local time base tlocal2x. Furthermore, the receivers 21x, 23x are clocked to this clock. The term "local clock" is understood to mean an oscillator providing a stable frequency signal which makes it possible, on its rising or falling edges, to trigger and clock the sampling of the acquisitions by each receiver. Moreover, the counting of the clock edges provides a common timestamping of the samples of each acquisition.

When the GNSS signal is available, the local time base is synchronized on an absolute time base resulting from the demodulation of the GNSS signal. In this regard, the second receiver 23x is configured to acquire signals from a satellite positioning system 5, and is further configured to demodulate the acquired signals to extract therefrom an absolute time base in order to correct each local time base of each receiving station.

Thus, the receiving stations 2x are mutually synchronized by means of the signal from the satellite positioning system using this absolute time base. Note that when the GNSS signal is not available, the local time base which is no longer slaved to the absolute time will drift weakly but independently for all the receiving stations such that the separation in synchronization increases with time.

Each receiving station 2a, 2b, 2c also comprises a receiving antenna A1x, connected to each receiver 21x, 23x. Furthermore, the receiving stations each comprise a communication interface (not shown) to communicate with the processing station 6.

As regards the acquisition, each receiver is composed of a conventional radio frequency receiving unit. This receiving line includes a frequency converter slaved to the frequency reference, a multi-channel digitization line deriving from an analog-to-digital converter slaved to the frequency reference. This receiving line well-known to those skilled in the art will not be described in further detail here.

This concerns the case where the GNSS signal is not available such that the local time base is no longer reliable and provides an erroneous date, which slowly drifts as soon as the GNSS signal becomes unavailable.

Figure 3:
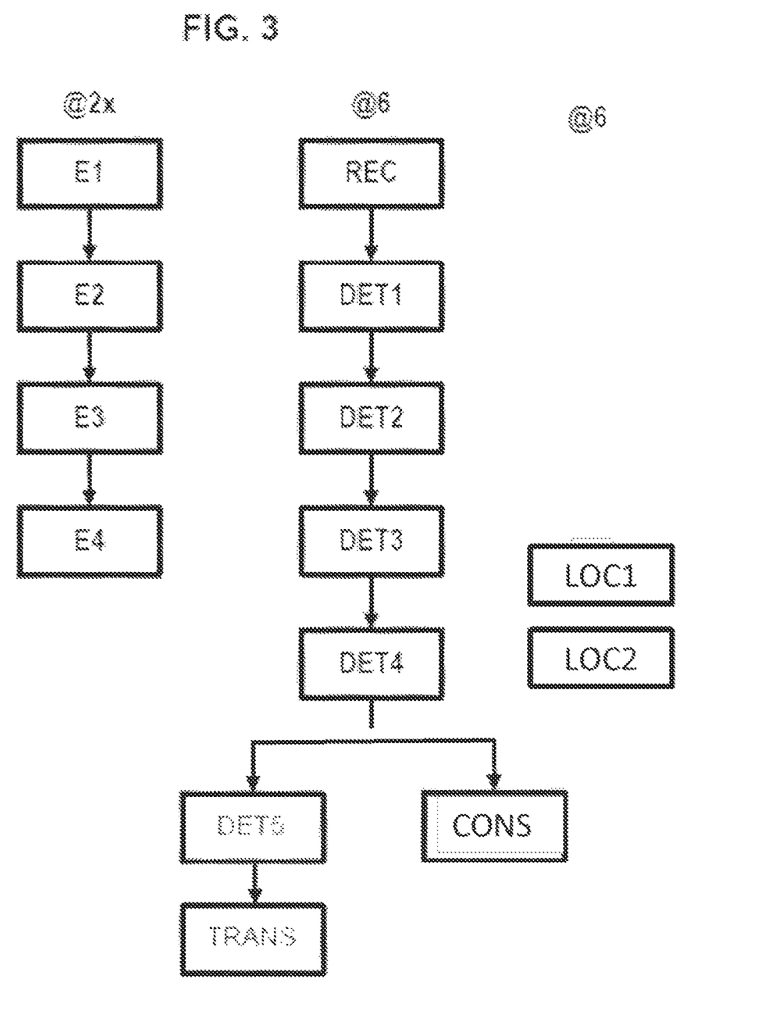
FIG. 3 illustrates a locating method according to the invention.

In this particular situation, a method for locating a transmitter 3 is described hereinafter in relation to FIG. 3. Such a method is implemented in a processing unit 7 of the processing station 6.

At least two receiving stations 2a, 2b, 2c proceed to the acquisition (step E1) and the timestamping (step E2) of the portions of signals from the transmitter 3 to be located and of at least one known object 4. In particular, one obtains for the transmitter a signal Semetteur_x and for the object a signal Sobjet_x. These signals are dated using the local time base of each receiver station 2a, 2b, 2c.

These signals are transmitted (step E3) to the processing station 6 which will, after receiving these signals (step REC) for example correlate pairwise the signals from several stations in order to be able to compare identical portions of signals to deduce therefrom the TDOAij and/or FDOAij i.e. the time-domain and frequency-domain separations of identical signal portions (the indices i and j denote the stations a, b, c) determined for two stations i,j.

One of the objectives expected by the use of an object with a known ephemeris is to be able to correct the local time bases of the receiving stations, as soon as the TDOA of the known object or else the FDOAs of the known object are used.

As regards the TDOAij it is exactly the difference in propagation time taken by identical portions of the signal of the transmitter 3 to reach the station i and to reach the station j. Of course these time separations are measured in relation to the local time bases which are inaccurate given the absence of the GNSS signal.

Thus, on the basis of the timestamps of the received signals from at east two receiving stations 2a, 2b, 2c the processing station determines (step DET1) measured time separations $\text{TDOA\_objet}_{ij}^{MES}$, $\text{TDOA\_emetteur}_{ij}^{MES}$ corresponding to the received signals relating to the transmitter to be located and to the known object (or objects). Of course, similar processing is possible on the basis of the FDOAs.

Next, on the basis of known ephemerides and determined in an absolute time base in relation to at least one known object, theoretical time and/or frequency separations $\text{TDOA\_objet}_{ij}^{TH}$, $\text{FDO\_Aobjet}_{ij}^{TH}$ relating to the known object are determined (DET2).

By taking the difference of the separations measured and the theoretical values, one determines (step DET3) a time-domain error $\text{RES\_TDOA}_{ij}$ (or TDOA residual) affecting the TDOAs and which makes it possible to correct (step E4) the time bases of the receiving stations. In a similar manner a frequency error (or FDOA residual) could be computed on the bases of the measured FDOA values and the theoretical values.

According to an embodiment, on the basis of the residual errors affecting the measured TDOAs and/or FDOAs data of correction of the local time bases are determined (step DET5).

Then, these correction data are transmitted to each receiving station (step TRANS) which resets the date of its local clock.

According to an embodiment, the processing station keeps the residual and makes the timestamping corrections of the signal portions received from each station (step CONS).

Finally the locating (step LOC1) of the transmitter 3 using measured TDOAs and/or FDOAs once the receiving stations have corrected their local time base is carried out.

As regards the TDOA, this gives the following expression $$\text{TDOA\_objet}_{ij}^{MES} = \text{TDOA}_{ij}^{réel} + \text{CorrNoise} + \Delta_{ErrGNSS}^{ij} + \Delta_{ErrTshort}^{ij} + \Delta_{BiasCal}$$

With
$\text{TDOA}_{ij}^{Réel}$ the actual physical value, that one is seeking to measure;

CorrNoise; the correlation noise, typically AWGN (Additive White Gaussian Noise) (which is white, Gaussian, of zero mean and predictable energy and determined by the channel);

$\Delta_{BiasCal}$: the error incurred by the offsets of the physical device of the station and which can be calibrated (time of propagation through the equipment, uncertainty on the actual geographical position of the receivers), They are considered very stable on the scale of several weeks and are therefore considered as known since they are estimated by a calibration process;

$\Delta_{ErrGNSS}^{ij}$: the difference in timestamping error obtained by the use of the GNSS signal (typically low, tending to be of AWGN type).

$\Delta_{ErrTshort}^{ij}$: the difference in short-term timestamping error (which is not compensated for by the GPS correction process, thus the short-term clock jitter).

When the known object is tracked by the receiver stations (nominal rating) its position and therefore the actual $\text{TDOA}_{ij}^{Réel}$ values are known to the nearest error $\text{ERR\_PROPAG\_TDOA}_{ij}$ of the propagator which allows it to compute the theoretical value $\text{TDOA}_{ij}^{TH}$. By eliminating the terms that are assumed to be known, one therefore defines the TDOA residual by:
$\text{RES\_TDOA}_{ij} = \text{TDOA}_{ij}^{Mes} - \text{TDOA}_{ij}^{TH} = \text{ERR\_PROPAG\_TDOA}_{ij} + \text{CorrNoise} + \Delta_{ErrGNSS}^{ij} + \Delta_{ErrTshort}^{ij}$. (Here, it has been considered that $\Delta_{BiasCal}$ is known and has been removed).

Most of these terms are of negligible intensity by comparison with the drift that one is seeking to estimate and fall in the category of noise that can be approached by a low zero-mean noise. Once the stations are in nominal mode (start-up phase finished, time base slaved for the first time to the GNSS, then continuous slaving to the GNSS, etc.) the drift of $\text{REF\_FREQ}_i$ (and therefore the term $\Delta_{ErrTshort}^{ij}$) and the associated time base depends only on the characteristics of $\text{REF\_FREQ}_i$ in non-slaved mode. Its characteristics are chosen to be of very good quality. In nominal mode (namely when the time-domain synchronization making use of the GNSS constellations is operational), the tracking of a known object therefore makes it possible to estimate the short-term timestamping error (incurred by the short-term jitter in the local clocks) of the system which can be used to also correct the local clocks of the receiving stations. In one implementation of the invention, the processing loops using the known objects are active and used even when the GNSS synchronization is active and operational. These loops are then used solely in order to correct the short-term jitter in the local clocks.

In the event of the GNSS synchronization no longer being possible, the invention compensates both for mid-term and short-term drifts in the local clocks.

As described, the obtainment of the time-domain error is based on the tracking of a known object. The reliability of the measurements concerning it is therefore critical.

Specifically, when these are geostationary satellites, these latter can be in maneuvering phases such that their trajectories are not predictable on the basis if the ephemerides. The method of location of the transmitter to be located supposes the prior (and where applicable simultaneous) location of the reference artificial objects (step LOC2).

Hence, the locating method comprises a step of determining (step DET4) on the basis of the measured TDOAs and/or FDOAs relating to the known object, an indicator of reliability of the measured time separations, said reliability indicator having the aim of determining whether or not the ephemerides of the known object can be used for the local clock correction. This reliability indicator in particular makes it possible to determine whether or not the known object is in the process of maneuvering.

Of course the known object, when it is a celestial object (for example the sun) is not concerned by these concepts of reliability. Specifically, these known objects are classified and easily identifiable and extremely accurate ephemerides are available.

However, the classified natural objects may not be in permanent visibility (for example if one uses the sun as the known object, its visibility is of course subject to day/night alternation) for the high-reliability resetting measurements (not dependent on the propagation error) and the use of the artificial objects (for example geostationary) in constant visibility can systematically be used in relative resetting (subject to propagation error) in the phases of invisibility of the natural objects.

Furthermore, and advantageously, the reliability of the measurements resulting from the known objects consists in comparing several TDOA residuals obtained for several objects which are known but different to check the alignment of these time-domain residuals with one another since they are not meant to depend on the known object. If some of these objects diverge too far from the others then it can be deduced therefrom that their ephemeris is not reliable and the object can then be removed from the list of reference objects that can be used for maintaining the synchronization between the stations.

The invention claimed is:

1. A method for locating a transmitter, implemented in a processing unit of a processing station of a locating system comprising the following steps:
   receiving signals acquired by geographically remote receiving stations, said signals being dated by local time bases of each receiving station and corresponding to signals from a transmitter to be located and from at least one known object;
   determining, on the basis of the dated signals, the measured TDOAs relating to the transmitter to be located and to the object; and/or measured FDOAs relating to the transmitter to be located and to the known object;
   determining, on the basis of known ephemerides relating to the known object and of geographical positions of the stations; theoretical TDOAs relating to the known object; and/or theoretical FDOAs;
   determining, by taking the difference of the measured and theoretical TDOAs and/or FDOAs relating to the known object, a residual error affecting the measured TDOAs and/or FDOAs in such a way that each receiving station corrects its local clock or the processing station corrects the timestamps of the portions of the signals from each receiving station;
   determining the location of the transmitter using measured TDOAs and/or FDOAs once the receiving stations have corrected their local time base or the processing station has corrected the timestamps of the portions of the signals from each receiving station; and
   determining, on the basis of the measured TDOAs and/or FDOAs relating to several objects, an indicator of reliability of said measured time-domain or frequency-domain separations, said reliability indicator making it possible to determine whether or not the ephemerides of the known object can be used for the correction of the local clock and for, in particular, determining whether or not the known object is in the process of maneuvering.

2. The method as claimed in claim 1, comprising a step of determining, on the basis of the residuals affecting the measured TDOAs and/or FDOAs, a number of data of correction of the local time bases and a step of transmitting to each receiving station data of correction of the local time bases determined in such a way that each receiving station corrects its local clock.

3. The method as claimed in claim 1, comprising a step of keeping data of correction of the local time bases determined in such a way that the processing station corrects the timestamps of the portions of the signals received from each receiving station.

4. The method as claimed in claim 1, comprising a step of determining the location of the known object or known objects on the basis of measurements taken by the receiving stations.

5. The method as claimed in claim 1, comprising a step of keeping data of correction of the local time bases determined in such a way that the processing station corrects the timestamps of the portions of the signals received from each receiving station, wherein the location is used to determine the indicator of reliability.

6. The method as claimed in claim 1, wherein said determining consists in comparing several measured TDOAs and/or FDOAs for several objects which are known but different to check the consistency of the residuals with one another and determine all the objects that can be used for the correction of the local clock.

7. The method as claimed in claim 1, wherein the receiving stations are mutually synchronized by means of a signal coming from a satellite positioning system, preferably intermittently.

8. A system for locating a transmitter to be located, said locating system comprising a processing station comprising a processing unit configured to implement a method as claimed in claim 1, and at least two receiving stations each comprising: a local clock configured to provide a local time base; a first receiver configured to acquire signals from an object to be located, said first receiver being further configured to acquire signals from a known object, said acquired signals being dated by the local time base.

9. The system as claimed in claim 8, wherein each receiving station further comprises a second receiver configured to acquire signals from a satellite positioning system, said second receiver being further configured to demodulate the signals acquired by the second receiver to extract therefrom an absolute time base in order to correct the local time base of each receiving station.

10. The system as claimed in claim 8, wherein the processing station is constituted by one of the receiving stations.

11. A computer program product comprising code instructions for implementing a locating method as claimed in claim 1, when the latter is executed by a computer.

* * * * *